US012592744B2

(12) United States Patent
Sun et al.

(10) Patent No.: US 12,592,744 B2
(45) Date of Patent: Mar. 31, 2026

(54) MINIATURIZED RADIO-FREQUENCY TRANSCEIVER IN MICRO MEDICAL IMPLANT FOR DUAL-FUNCTIONAL WIRELESS POWER TRANSFER AND DATA COMMUNICATION

(71) Applicant: University of Pittsburgh—Of the Commonwealth System of Higher Education, Pittsburgh, PA (US)

(72) Inventors: Mingui Sun, Pittsburgh, PA (US); Zhi-Hong Mao, Sewickley, PA (US); Wenyan Jia, Wexford, PA (US); Tianfeng Wang, Pittsburgh, PA (US); Qi Xu, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 422 days.

(21) Appl. No.: 18/265,629

(22) PCT Filed: Dec. 7, 2021

(86) PCT No.: PCT/US2021/062242
§ 371 (c)(1),
(2) Date: Jun. 6, 2023

(87) PCT Pub. No.: WO2022/125570
PCT Pub. Date: Jun. 16, 2022

(65) Prior Publication Data
US 2024/0048184 A1      Feb. 8, 2024

Related U.S. Application Data

(60) Provisional application No. 63/123,988, filed on Dec. 10, 2020.

(51) Int. Cl.
| | | |
|---|---|---|
| *H04B 5/79* | (2024.01) | |
| *H01Q 7/00* | (2006.01) | |
(Continued)

(52) U.S. Cl.
CPC ................. *H04B 5/79* (2024.01); *H01Q 7/00* (2013.01); *H02J 50/10* (2016.02); *H02J 50/20* (2016.02); *H02J 50/80* (2016.02)

(58) Field of Classification Search
CPC ....................................................... H04B 5/79
See application file for complete search history.

(56) References Cited

U.S. PATENT DOCUMENTS

| | | | | |
|---|---|---|---|---|
| 10,574,079 | B1 * | 2/2020 | Berkowitz | .............. H02J 50/10 |
| 2009/0230777 | A1 * | 9/2009 | Baarman | ................. H04B 5/77 |
| | | | | 307/104 |

(Continued)

FOREIGN PATENT DOCUMENTS

| | | |
|---|---|---|
| WO | 2010104569 A1 | 9/2010 |
| WO | 2017027326 A1 | 2/2017 |

OTHER PUBLICATIONS

International Search Report and Written Opinion for International Application PCT/US2021/62242, Mar. 11, 2022, 8 pages.

*Primary Examiner* — Wen W Huang
(74) *Attorney, Agent, or Firm* — Klarquist Sparkman, LLP

(57) ABSTRACT

Implants include a single tapped coil antenna having a first section and a second section for wireless power transfer, data downlink and data uplink. A modulated wireless power transfer signal is received by the tapped coil antenna and used to provide electrical power. The modulation is detected to generate downlink data. A switch is used to charge a section of the tapped coil antenna by establish a current which is then be interrupted by opening the switch. The switching produces a high-amplitude pulsed magnetic field (Continued)

RECEIVE WPT SIGNAL
402

PROVIDE IMPLANT POWER BASED ON WPT SIGNAL
404

DETECT MODULATION OF WPT SIGNAL AND DEMODULATE FOR DOWNLINK COMMUNICATION
406

UPLINK DATA?
407
NO / YES

PROVIDE UPLINK DATA TO TAPPED ANTENNA BY ALTERNATING BEWTEEN A CHARGING STATE ESTABLISHING A COIL CURRENT AND AN EMITTING STATE BY INTERRUPTING THE COIL CURRENT
408

UPLINK DATA COMPLETE?
410
YES / NO

400

(PMF) for use in data uplink over a large distance between the implant and an external transceiver.

23 Claims, 6 Drawing Sheets

(51) Int. Cl.
*H02J 50/10* (2016.01)
*H02J 50/20* (2016.01)
*H02J 50/80* (2016.01)

(56) References Cited

U.S. PATENT DOCUMENTS

| | | | | |
|---|---|---|---|---|
| 2011/0248825 A1* | 10/2011 | Hamel | ..................... | H04Q 9/00 |
| | | | | 340/10.1 |
| 2013/0207603 A1* | 8/2013 | Kappeler | ............... | H02J 50/12 |
| | | | | 320/108 |
| 2013/0249312 A1* | 9/2013 | Uchida | .................... | H04B 5/79 |
| | | | | 307/104 |
| 2013/0300357 A1* | 11/2013 | Mercier | .................... | H02J 7/00 |
| | | | | 320/108 |
| 2014/0162554 A1* | 6/2014 | Sankar | ..................... | H04B 5/79 |
| | | | | 455/41.2 |
| 2017/0040693 A1* | 2/2017 | Luzinski | ................. | H04B 5/43 |
| 2018/0034319 A1* | 2/2018 | Robert | ..................... | H04B 5/79 |
| 2020/0005988 A1 | 1/2020 | Iyer et al. | | |
| 2020/0328614 A1* | 10/2020 | Jackson | ................ | G04C 10/04 |
| 2021/0044150 A1* | 2/2021 | Tang | ....................... | H01F 27/28 |
| 2021/0143672 A1* | 5/2021 | Moubedi | ................ | H02J 50/10 |

* cited by examiner

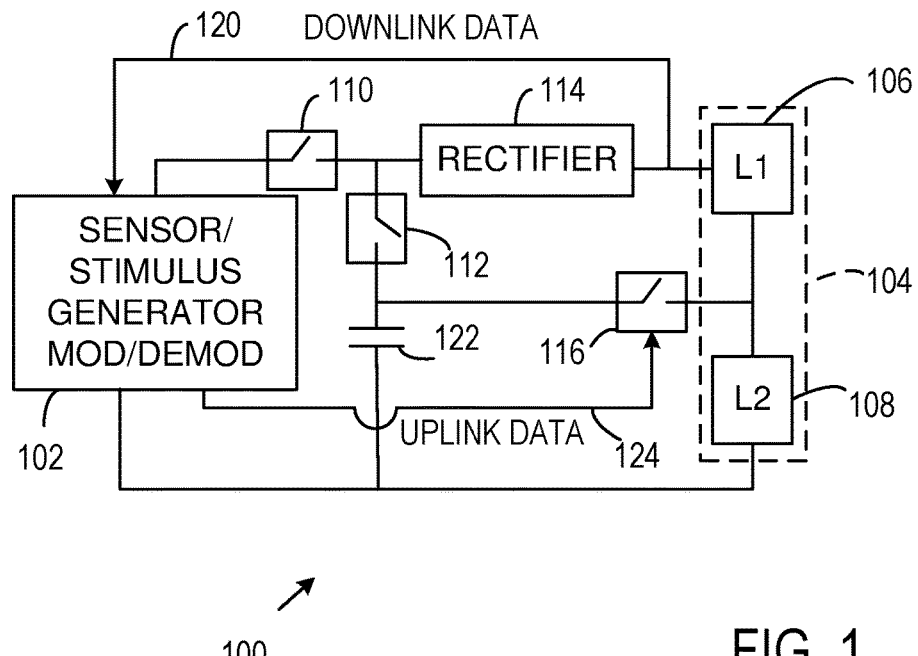
100
FIG. 1
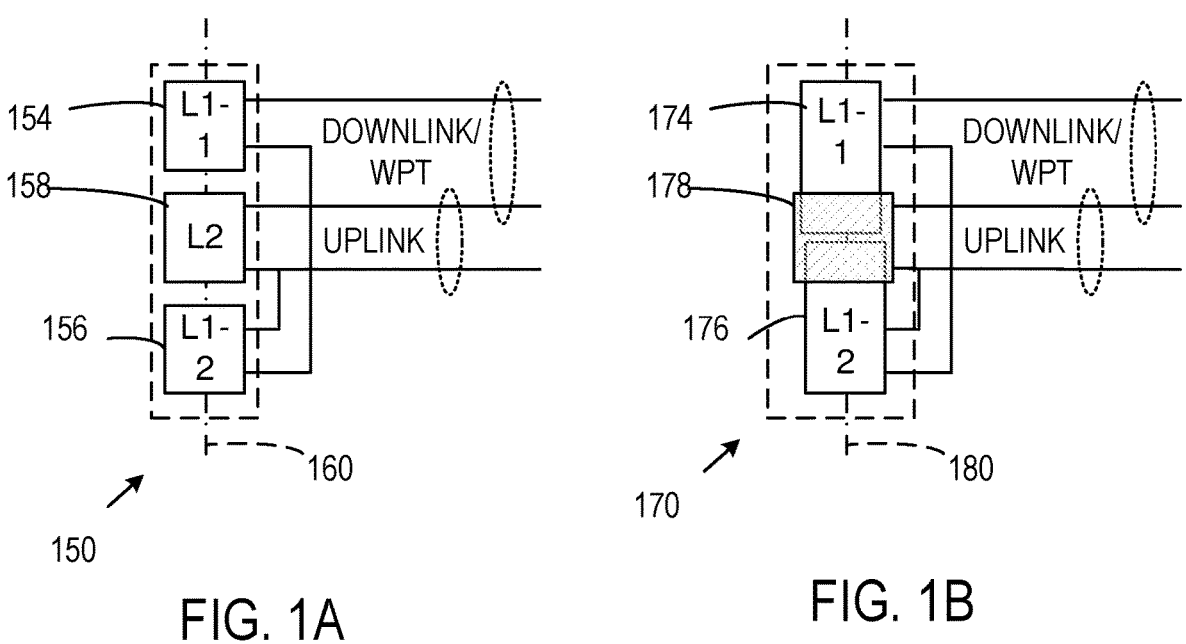
150
FIG. 1A
170
FIG. 1B

FIG. 3A

RECEIVE WPT SIGNAL
402

PROVIDE IMPLANT POWER BASED ON WPT SIGNAL
404

DETECT MODULATION OF WPT SIGNAL AND DEMODULATE
FOR DOWNLINK COMMUNICATION
406

NO        UPLINK DATA?
407

YES

PROVIDE UPLINK DATA TO TAPPED ANTENNA BY
ALTERNATING BEWTEEN A  CHARGING STATE ESTABLISHING
A COIL  CURRENT AND AN EMITTING STATE BY
INTERRUPTING THE COIL CURRENT
408

YES        UPLINK DATA
COMPLETE?
410        NO

400

MINIATURIZED RADIO-FREQUENCY TRANSCEIVER IN MICRO MEDICAL IMPLANT FOR DUAL-FUNCTIONAL WIRELESS POWER TRANSFER AND DATA COMMUNICATION

CROSS REFERENCE TO RELATED APPLICATIONS

This application is the U.S. National Stage of International Application No. PCT/US2021/062242, filed Dec. 7, 2021, which was published in English under PCT Article 21 (2), which in turn claims the benefit of U.S. Provisional Application No. 63/123,988, filed Dec. 10, 2020, which is incorporated herein by reference.

FIELD

The disclosure pertains to implants having wireless power transfer.

BACKGROUND

Wireless power transfer (WPT) which can deliver power from outside of the human body or animal body to the inside can eliminate repeated surgical replacement of depleted batteries from the inside of the body. WPT can also reduce the sizes of implanted devices since the device battery is largely responsible for device size and weight. Numerous commercial products have adopted WPT approaches. While conventional WPT approaches can provide power transfer to implanted devices, they do not satisfactorily address data communication to and from implanted devices, i.e., combining WPT and Radio-Frequency (RF) data communication. In some approaches, different antenna pairs are used for communication and power transfer, increasing implant size. In such systems, an antenna pair is used for power transfer and communication to the implant (downlink) and another antenna pair used for communication from the implant (uplink). Unfortunately, the use of two antennas increases implant size and alternative approaches are needed.

SUMMARY

Implant and implant systems with wireless power transfer and one or more of uplink and downlink data transmission are disclosed. In some examples, wireless power transfer and communication systems comprise a tapped coil antenna having a first section and a second section situated about a common axis, wherein the tapped coil antenna is operable to couple a downlink signal based on an RF signal from a remote transmitter to an implant to provide electrical power and downlink data. A switch (such as a semiconductor-based switch) is coupled to the implant and to the tapped coil antenna, wherein the switch is operable to selectively connect the second section of the tapped coil antenna to generate a corresponding pulsed magnetic field based on an uplink data signal. In examples, a rectifier is coupled to the tapped coil antenna to provide electrical power to the implant based on the downlink signal. In further examples, the switch is operable to selectively connect and disconnect the second section of the tapped coil antenna based on the uplink data signal. In embodiments, the tapped coil antenna is operable to couple a downlink signal based on the RF signal from a remote transmitter received by the first section and the second section to the implant to provide electrical power and downlink data. In further embodiments, the second section of the tapped coil antenna is situated between and partially on top of first and second portions of the first section or the second section of the tapped coil antenna is sandwiched between first and second portions of the first section. In examples, a demodulator is provided that is operable to produce downlink data based on a modulation of the RF signal. In more examples, a demodulator is operable to produce downlink data based on an amplitude modulation of the RF signal. In some examples, the switch is operable to establish a charging state associated with establishing a current in the second section of the tapped coil antenna and an emitting state.

Methods comprise receiving an RF signal with a tapped coil antenna having a first section and a second section to produce a received electrical signal, processing the received electrical signal to produce electrical power for operating an implant, and selectively connecting and disconnecting the second section of the tapped coil antenna based on uplink data to produce a corresponding pulsed magnetic field. In examples, the pulsed magnetic field is produced by selectively disconnecting the second section of the tapped coil antenna. In more examples, methods include establishing an electrical current in at least the second section of the tapped coil antenna, wherein the pulsed magnetic field is based on a selective interruption of the established electrical current in the second section of the tapped coil antenna. In examples, the selective connecting or disconnecting the second section of the tapped coil antenna is produced with a switch. In some embodiments, the second section of the tapped coil antenna is sandwiched between portions of the first section of the tapped coil antenna or the second section of the tapped coil antenna is symmetrically sandwiched between portions of the first section of the tapped coil antenna. In representative examples, the pulsed magnetic field is oscillatory at a frequency associated with producing the electrical power. In additional examples, the received electrical signal includes a component at the frequency associated with producing the electrical power.

Communication and power transfer systems for an implant comprise an antenna comprising a first section and a second section coupled in series, a switch operable to establish a current in the second section and interrupt the established current to produce a pulsed magnetic field with the first section and the second section of the antenna, and a controller coupled to close and open the switch to produce the pulsed magnetic field. In examples, the antenna is a tapped coil or a tapped helical conductor. In more examples, a rectifier and a demodulator coupled to the antenna are provided and are operable to produce electrical power and a data signal based on an RF signal received by the antenna.

The foregoing and other features, and advantages will become more apparent from the following detailed description, which proceeds with reference to the accompanying figures.

BRIEF DESCRIPTION OF THE DRAWINGS

FIG. 1 illustrates a representative implant system that includes a tapped coil antenna.

FIGS. 1A-1B are block diagrams illustrating tapped coil antennas.

FIG. 3A illustrates portions of a representative implant and external transceiver.

DETAILED DESCRIPTION

Introduction and Terminology

Figures 2A, 2B, 2C, 2D:
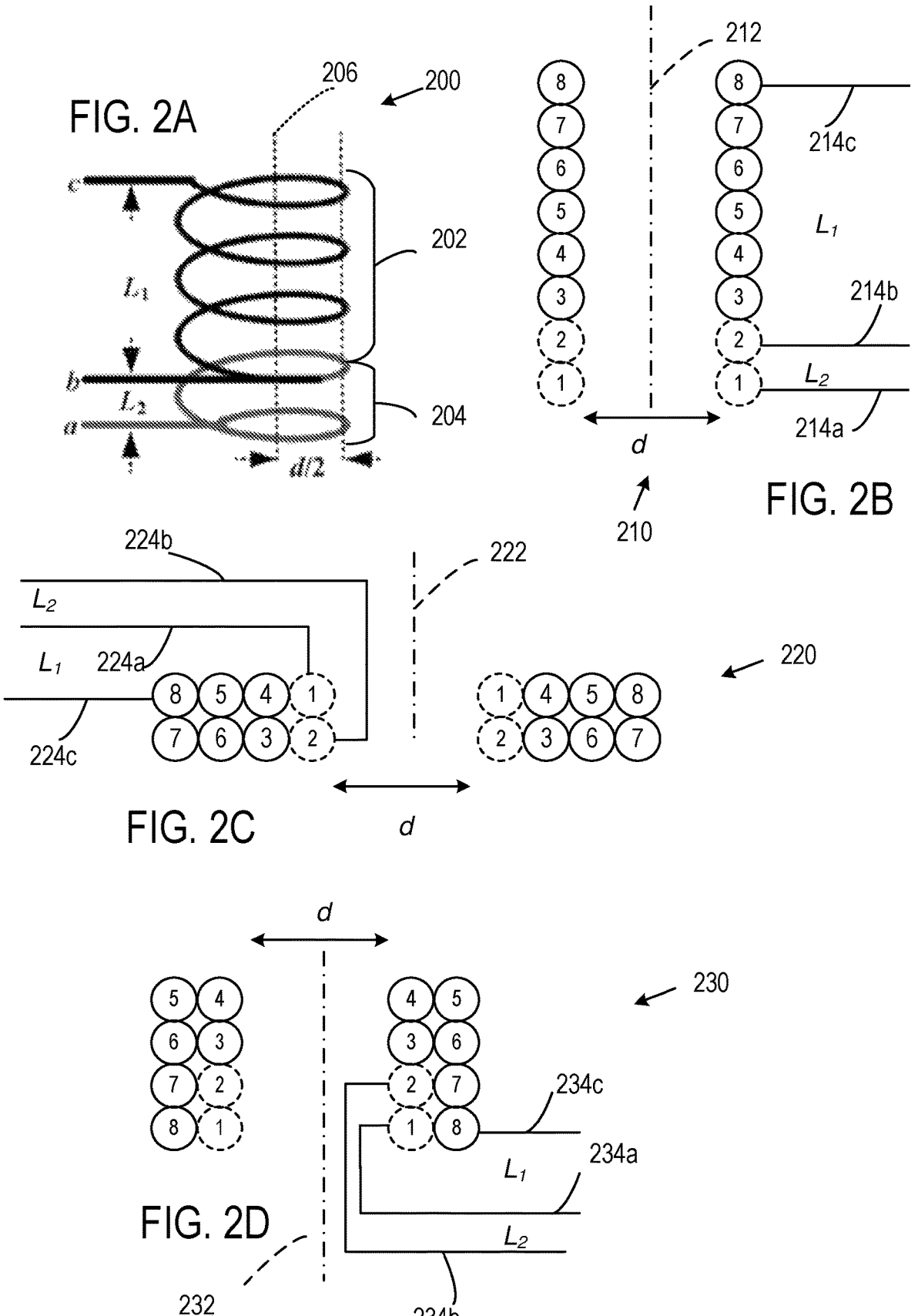
FIGS. 2A-2F illustrate representative configurations of tapped coil antennas.

As used herein, "implant" or "implant device" refers to an electronic device suitable for implanting in a subject such as a human or animal. Implants can include one or more sensors suitable for obtaining measurements of subject physiological, electrical, chemical, mechanical, or other parameters. Implants can also include stimulus generators that are operable to generate electrical signals to regulate subject functions such as muscle or heart activity or other functions. In some cases, stimulus generators are provided to dispense materials such as pharmaceutical compounds or other materials. Implants generally include circuitry for data communications to the implant (referred to as downlink communications herein) and from the implant to a receiver outside of the subject (uplink communication as used herein). Implants can include one or more processors, data modulators, demodulators, memory devices, timing circuits and elements such as clock circuits and other electronic components. While implants can include wireless power transfer circuitry and uplink/downlink antennas and associated electronics, circuitry for these functions is described and shown separately for convenient illustration.

Uplink communication uses an uplink signal that is coupled to an antenna to produce a modulated (e.g., amplitude, phase, or frequency modulation) magnetic field which can be referred to as a transmitted uplink signal containing uplink data. Similarly, a downlink radio frequency signal received by a suitable antenna can produce a downlink signal that is coupled to the implant to provide downlink data such as commands and procedures for implant operation and communication.

RF signal refers to an electromagnetic signal that is transmissible without direct electrical connection such as wires or other conductors.

"Coil" refers to loops of a conductor such as wire coupled in series and situated along a common axis. Loops of a coil can be circular, square, polygonal, ovoid, elliptical, or other regular or irregular shapes. A coil can comprise loops of a common shape and size or multiple shapes and sizes. In addition, loops can be situated symmetrically with respect to the axis. In typical examples, coils comprise loops that form a cylindrical shape, with diameter varying to accommodate loops that are situated on top of each other. A tapped coil is a coil that has at least one electrical connection at an intermediate location in the series-connected loops that form the coil. For convenience, tapped coils are referred to as tapped coil antennas as they serve to produce and receive RF signals for communications without direct electrical contact.

As used herein, "switch" refers to a device that makes and breaks an electrical connection. Some such devices are based on connecting and disconnecting conductors and are referred to herein as "conductor-based switches." In other examples, such devices are based on semiconductors and are referred to herein as "semiconductor switches" or "electronic switches.

In some cases, oscillating electrical currents and voltages are referred as sinusoidal, but such oscillating signals can differ from pure sinusoids and are referred to as sinusoidal for convenient explanation.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

Example 1. Representative Implanted Systems

Referring to FIG. 1, a representative implantable system 100 includes an implant device 102 that includes electronics for one or more of sensing, stimulus generation, data modulation and demodulation, power management, or other functions. The device 102 is coupled to a tapped coil antenna 104 that includes a first section 106 and a second section 108. The device 102 is also coupled to switches 110, 112 that are operable to control wireless power transfer (WPT) based on a received electrical signal from the tapped antenna 104 that is produced in response to an RF signal. As used herein, "switch" refers to any type of switch including those based on connecting and disconnecting conductors and those based on semiconductors (electronic switches). The received electrical signal from the tapped coil antenna 104 is generally delivered to a rectifier 114 that is coupled to the implant device 102 by the switch 110. The rectified received electrical signal can be coupled to other circuit elements for filtering, storage, voltage regulation, or other purposes but such circuit elements are not shown in FIG. 1 for convenient illustration.

Downlink data from the tapped coil antenna 104 is directed to the implant device 102 along a circuit path 120 for demodulation. In one example, the downlink data is transmitted as amplitude-shift-keying (ASK) data. During time intervals associated with WPT the switches 110, 112 can be closed so that the rectified received electrical signal is coupled to charge capacitor 122 and power the implant device 102. During WPT, downlink data can be obtained from a demodulation of the received electrical signal. For example, an RF signal at a fixed frequency can be used for power transfer and this RF signal can be amplitude modulated to provide downlink data. Thus, a common RF signal can be used for WPT and downlink communication. The switches 110, 112 can be used to decouple some circuit portions as needed.

Uplink data is provided by a modulator associated with the implant device 102 to a switch 116. Upon receipt of uplink data along path 124, the switch 116 can be selectively toggled (open to closed or vice versa) to generate a pulsed magnetic field. By controlling the switch 116 based on the uplink data, a series of magnetic field pulses is produced that can be transmitted to a remote receiver. The capacitance of the capacitor 122 and the inductances of the tapped coil antenna 104 are generally selected so that the magnetic field pulses are associated with oscillations at a frequency corresponding to frequencies used for WPT and downlink communication. Signals applied to the second section 108 induce larger signals in the tapped coil antenna 104 (both sections) so that the pulsed magnetic fields (PMFs) emitted can have larger amplitudes.

A tapped coil antenna is preferably configured as shown in FIG. 1A. The tapped coil antenna 150 includes a first section that comprises a first portion 154 and a second portion 156. A second section 158 that is connected to receive data uplink signals is situated or "sandwiched" between the first portion 154 and the second portion 156. As in FIG. 1, both sections are coupled for WPT and data downlink and provide increased amplitudes for PMFs produced by uplink signal to the section 158, Typically both sections are situated symmetrically situated about an axis 160.

In another example shown in FIG. 1B, a tapped coil antenna 170 includes a first section that comprises a first portion 174 and a second portion 176. A second section 178 that is used for data uplink is situated or "sandwiched" between the first portion 174 and the second portion 176 as well as being situated under or on top of some loops of the first section. As in FIG. 1, both sections are generally symmetrically situated about an axis 180.

Example 2. Representative Tapped Coil Antennas

Referring to FIG. 2A, a representative tapped coil antenna 200 includes a first section 202 that defines a first inductance $L_1$ and a second section 204 that defines a section inductance $L_2$. The first section 202 and the second section 204 are situated about an axis 206 and are formed of circular windings of diameter d. Uplink connections are between a and b; downlink connections are between a and c.

FIGS. 2B-2E illustrate representative implementations of tapped coil antennas formed of circular windings of diameter d. For convenient illustration, total numbers of turns are used that can be smaller than typical implementations and loops associated with a second section (a section coupled to receive uplink modulations are shown with dashed lines). associated inductances $L_1$ and $L_2$ of the first and second sections are shown. All are shown as having diameter d.

In an example shown in FIG. 2B, a tapped coil antenna 210 includes loops 3-8 that form a first section and loops 1-2 that form a second section with the loops distributed along an axis 212. Taps 214a, 214b are associated with the second section 204 and taps 214b, 214c are associated with the first section 202.

In an example shown in FIG. 2C, a tapped coil antenna 220 includes a first section (loops 3-8) situated radially on top of a second section (loops 1-2) and the loops are wound about an axis 222. Taps 224a, 224b are associated with the second section and taps 224b, 224c are associated with the first section.

In an example shown in FIG. 2D, a tapped coil antenna 230 includes a first section (loops 3-8) with loops 7-8 situated radially on top of a second section (loops 1-2). The loops are wound about an axis 232 and the loops 1-2 are situated at an end of the tapped coil antenna 230. Taps 234a, 234b are associated with the second section and taps 234b, 234c are associated with the first section. In a preferred example shown in FIG. 2E, a tapped coil antenna 240 includes a second section 243 (loops 1-6) situated between a first portion 241 and second portion 242 of a first section (loops 7-18) along an axis 248. The loops are shown as wound along a cylindrical form 246. Typically, a form used for winding loops is non-magnetic and makes little contribution to loop inductances. As noted previously, loops of other shapes can be used. Tapped connections for the first section and second section are shown with the respective inductances $L_1$ and $L_2$. Taps 244a, 244b are associated with the second section 243 and taps 244b, 244c are associated with the first section formed by portions 241, 242.

Figures 2E, 2F, 2G:
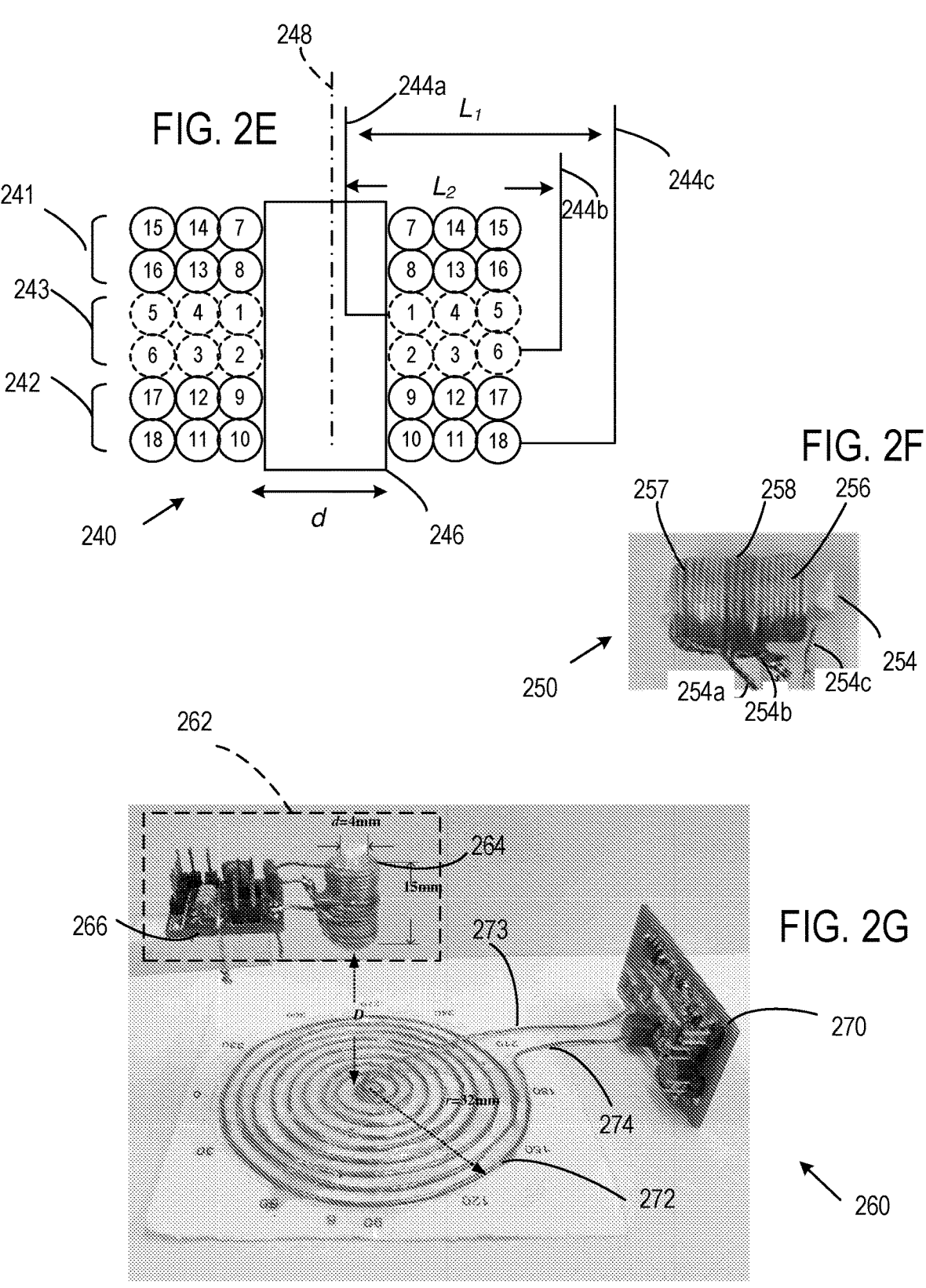
FIG. 2G illustrates a representative WPT system using a tapped coil antenna such as shown in FIGS. 2A-2F.

FIG. 2F is a photograph of a representative implementation of a tapped coil antenna 250 that includes a first section (portions 256, 257) and a second section 258 which are wrapped about a coil form 254. Taps 254a, 254b are associated with the second section 258 and taps 254b, 254c are associated with the first section formed by portions 257, 256.

FIG. 2G illustrates a representative prototype WPT/communication system 260 that includes an implant 262 comprising a tapped coil antenna 264 as discussed above and a transmitter/receiver 266 for uplink and downlink communications and WPT. A receiver/transmitter 270 configured for placement external to a subject is coupled to an external antenna 272 that in this example is a planar spiral conductor. The receiver/transmitter 270 is coupled to a center of the spiral conductor at 273 and to the perimeter end at 274. In this example, the spiral has a diameter of 64 mm and includes about 10 turns, but other sizes can be used. The coil antenna 272 (external) and the tapped coil antenna (in the implant) are situated a distance D apart, wherein D is selected to provide suitable WPT and uplink/downlink communications. In this example, the tapped coil antenna 264 has an axal length of 15 mm and an inner diameter of 4 mm, but other sizes can be used.

Example 3. Representative Implant (In Vivo) and Transceiver (Ex Vivo)

With reference to FIG. 3, a representative implant system 300 includes an implant 302 and an external transceiver (outside the human body) 350 configured to communicate with and provide power (via WPT) to the implant 302. The implant 302 includes a load 304 that is associated with implant functions such as sensing or stimulus generation and uplink circuitry 306. The uplink circuitry 306 includes capacitors 307 ($C_m$), 317 ($C_1$), a tapped coil antenna 310, and switch 312 that is operable in response to a modulator 314 and controller 316 to produce a pulsed magnetic field (PMF) emitted by tapped coil antenna 310 based on electrical pulses in response to toggling of the switch 312. The PMF is received by an antenna 352 in the external transceiver 350 and an associated electrical signal demodulated to produce uplink data from the implant 302 with a controller 326 such as a microprocessor, a programmable logic device, or other digital control device or demodulator.

The antenna 352 is also situated to receive an electrical signal associated with downlink data for transmission to the implant 302 as well as provide a WPT signal that can be processed at the implant 302 with appropriate circuit elements such as a rectifier and one or more capacitors for powering the implant 302. The external transceiver system 350 includes a downlink section 360 that is coupled to provide suitable modulated data (ASK data in this example) to the antenna 352. The external transceiver system 350 also includes a WPT section 362 that is coupled to provide a WPT signal to the antenna 352. The downlink transmission and the WPT transmission are received by the tapped coil antenna 310 and processed to provide data associated with implant control/sensing via a demodulator 318 and power for operation of the implant 302. Additional switches 319, 320 are provided to decouple WPT.

In some examples, the antenna 352 is a planar spiral, but other antenna configurations can be used. The tapped coil antenna 310 can include a sandwiched section as shown in FIG. 2E and have an internal diameter of between 0.5 mm and 10 mm, and an axial length of between 1 and 50 mm. In particular examples, an internal diameter is 4 mm and an axial length is 15 mm.

Figure 3A:
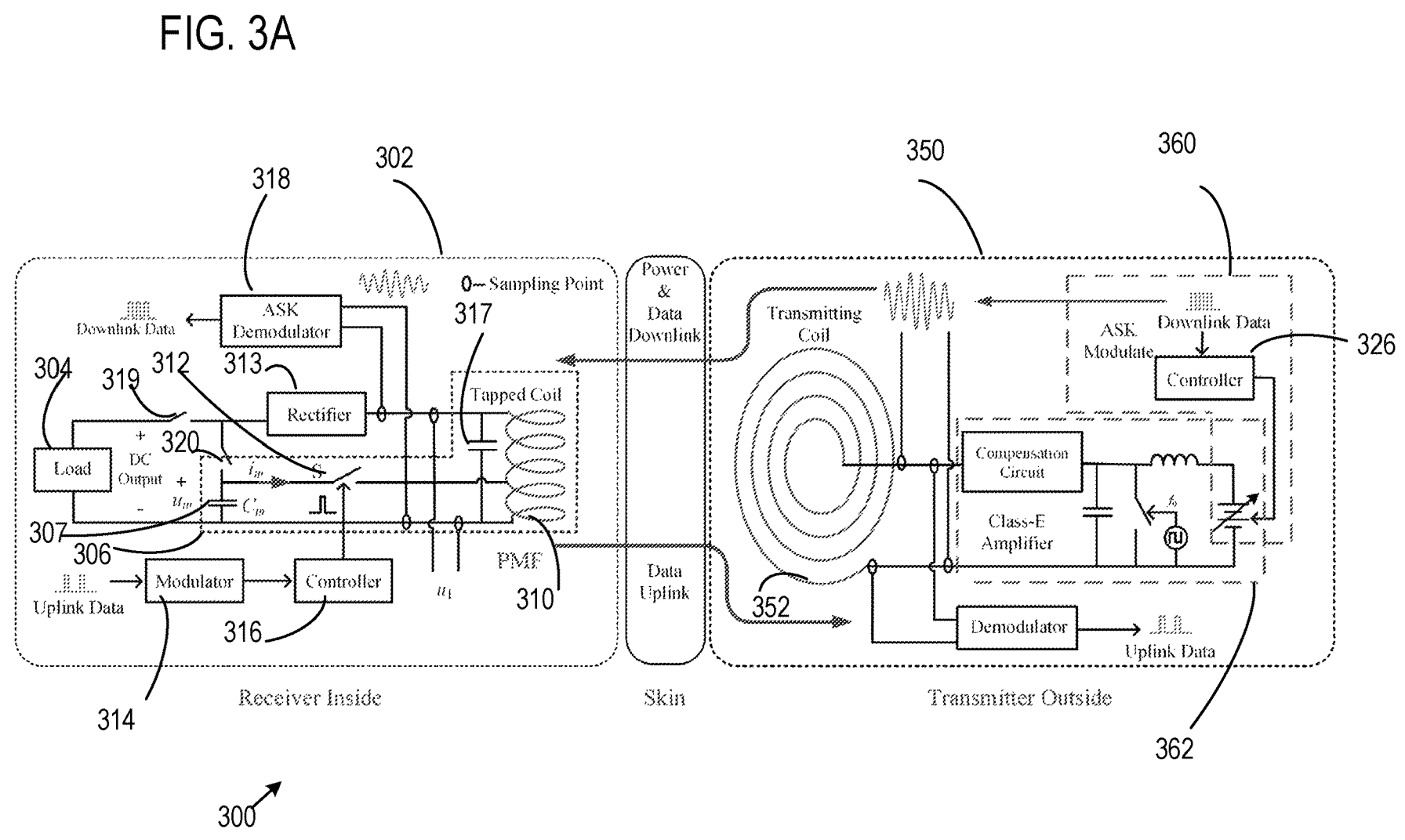
Figure 3B:
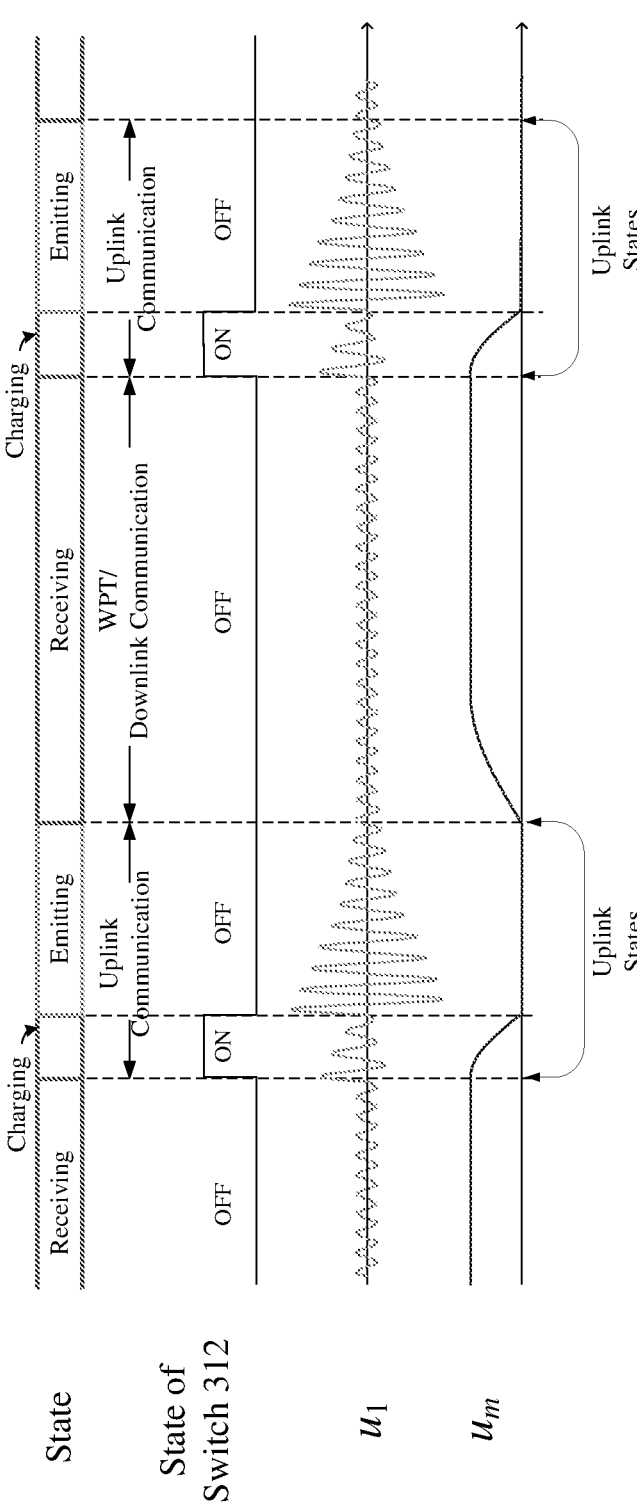
FIG. 3B illustrates operation of the system of FIG. 3A.

FIG. 3B illustrates operation of the system of FIG. 3A. In a WPT state the entire tapped coil is used and the capacitor 307 ($C_m$) is charged to a stable value. A power-amplified sinusoid or other WPT signal (shown in FIG. 3A as generated by a Class-E amplifier at a frequency $f_0$) is wirelessly transmitted as a magnetic field by the planar spiral coil 352. The tapped coil antenna 310 (or a double-helix antenna) receives part of the sinusoidal magnetic field which is then processed (e.g., multiplied, rectified, filtered) and energy is stored in the capacitor 307 ($C_m$) with a voltage $u_m$. At this time, the signal from the controller 316 for the switch 312 is LOW (e.g., 0V) or otherwise configured so that the switch 312 is OFF and the capacitor 307 ($C_m$) is disconnected from the tapped coil antenna 310. In a downlink state, downlink data transmission and WPT power transfer are performed simultaneously and the uplink circuitry 306 is disconnected but the amplitude of the WPT voltage at the transmitter side is modulated for downlink signal transmission. A variation of a voltage $u_1$ across the capacitor 317 ($C_1$) is captured and decoded into a binary data stream using, for example, ASK demodulation.

Uplink communication is much more difficult because of the limited size of the tapped coil antenna 310 and the limited available power. To produce an uplink signal, power can be provided by the capacitor 307 ($C_m$) as charged as discussed above. To transmit a binary value "1" in the uplink data, a charging state and an emitting state are provided sequentially. As shown in FIG. 3B, in the charging state, the control signal is HIGH, the switch 312 is ON, the capacitor 307 ($C_m$) is connected to the tapped coil antenna 310, and a voltage $u_m$ across the capacitor 307 ($C_m$), where the phases of the voltage $u_m$ and the associated current differ by 90°. Thus, when $u_m$ reaches zero, the current reaches the peak value. At this time, the switch 312 is turned OFF to enter the emitting state. Due to a sudden cutoff of current and a voltage step-up effect of the tapped coil antenna 310, a high-amplitude PMF is generated by the entire tapped coil antenna 310 excited by a voltage spike $u_1$ at the capacitor 317 ($C_1$) for external detection. the capacitor 317 and coil antenna 310 form an oscillating LC-tank with a resonant frequency the same as the common frequency for WPT. The timing of the turning the switch 312 from ON to OFF can be predetermined, and the switch 312 controlled accordingly. As shown in FIG. 3B, downlink and WPT are associated with a common frequency and the uplink PMF is associated with this common frequency as well. Different frequencies can be used, but use of common frequency tends to provide superior energy efficiency and allow the use of the same coil antenna for WPT, data downlink and data uplink, saving space within implant 300.

In one example, a frequency of 4 MHz can be used for downlink and WPT, and the PMF configured to have 4 MHz oscillations. Various kinds of switches can be used to establish charging and emitting states including digital or analog switches with switching times that are suitable for the selected frequency of operation.

Use of a single frequency for both WPT and communication can be expected to change WPT performance. In the downlink state, WPT and communication are conducted simultaneously in the same direction (i.e., to an implant). The PMF circuitry can be disconnected thus has no effect on WPT efficiency. However, the amplitude of the WPT voltage is modulated for downlink signal transmission, which can have an effect on WPT but this generally small as the time for downlink (mostly for sending system commands) is relatively short. In the uplink state, on the other hand, the PMF circuitry can have an effect because within the duration of each PMF pulse, WPT is interrupted to allow uplink data transmission. However, degradation of WPT can be acceptable in order to produce a selected PMF amplitude.

Example 4. Representative WPT and Communication Method

Figure 4:
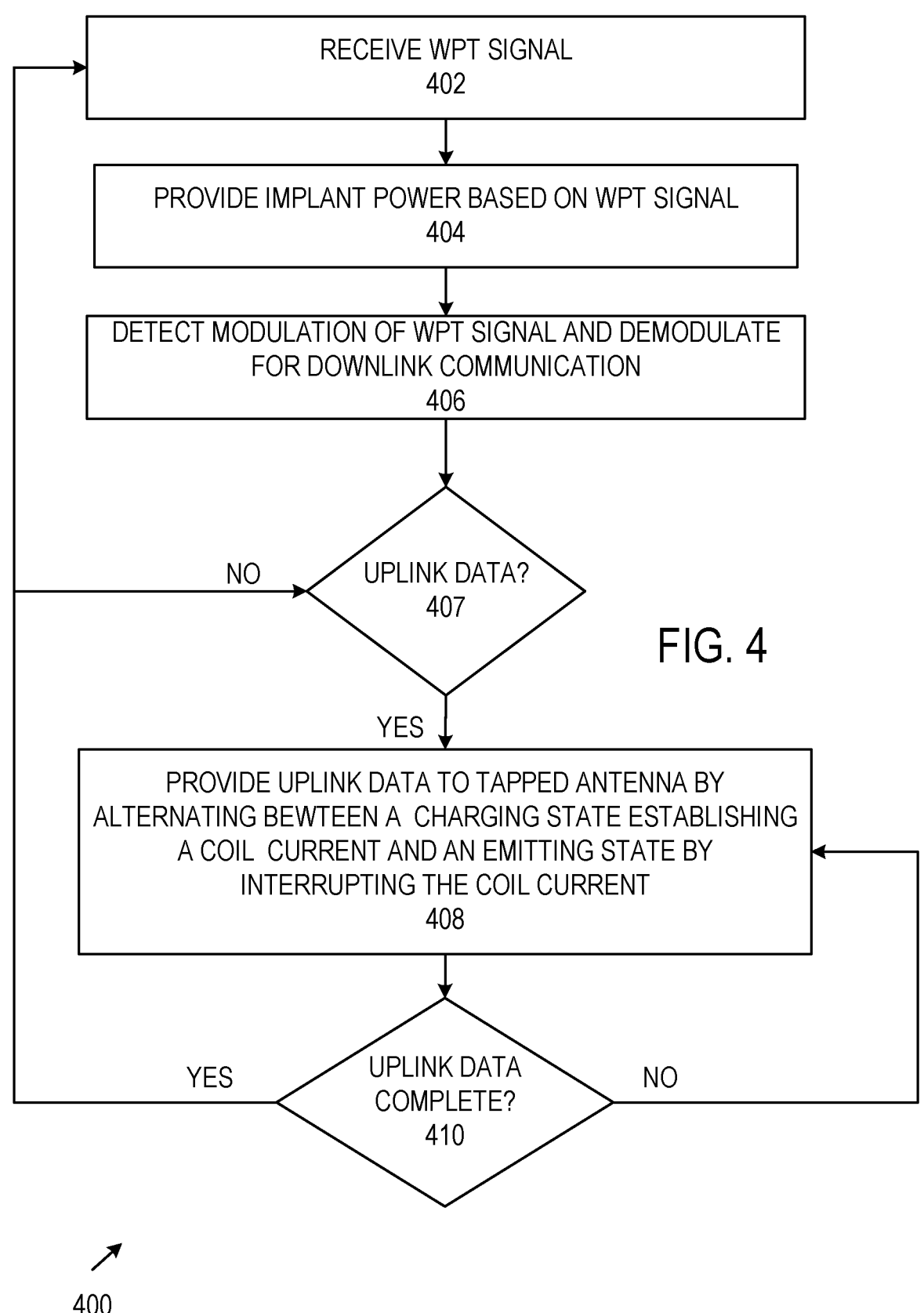
FIG. 4 illustrates a representative method.

Referring to FIG. 4, a representative method 400 includes receiving a WPT signal at 402 and providing power to an implant based on the received WPT signal at 404. At 406, a modulation of the WPT signal (if any) is detected and demodulated to provide downlink data. At 407, it is determined if uplink data is to be communicated. If not, the method can return to 402 to continue receiving power via WPT and decoding any downlink data. If uplink data is to be transmitted, at 402, a charging state and an emitting state are alternated for each bit to be transmitted at 408. In the charging state, a current is established in a section of a tapped coil antenna, typically a tapped helical coil but a tapped planar coil can also be used. In the emitting state, the established current is interrupted, typically with a digitally controlled switch. This interruption produces a pulsed magnetic field with the entire tapped coil antenna. The magnitude of the pulsed magnetic field is dependent on the section of the tapped coil antenna used in charging and the total size (for example, number of turns) of the tapped coil antenna. This can provide an unexpectedly large pulsed magnetic field, enabling uplink data transmission over a large distance. If uplink data transmission is complete as determined at 410, the method returns to 402. If additional data remains, the method returns to 408.

Example 5. Representative Embodiments

Embodiment 1 is a wireless power transfer and communication system, including: a tapped coil antenna comprising a first section and a second section situated about a common axis, wherein the tapped coil antenna is operable to couple a downlink signal based on an RF signal from a remote transmitter to an implant to provide electrical power and downlink data; and a switch coupled to the implant and to the tapped coil antenna, wherein the switch is operable to selectively connect the second section of the tapped coil antenna to generate a corresponding pulsed magnetic field based on an uplink data signal.

Embodiment 2 includes the subject matter of Embodiment 1, and further includes a rectifier coupled to the tapped coil antenna and to provide electrical power to the implant based on the downlink signal.

Embodiment 3 includes the subject matter of any of Embodiments 1-2, and further specifies that the switch is operable to selectively connect and disconnect the second section of the tapped coil antenna based on the uplink data signal.

Embodiment 4 includes the subject matter of any of Embodiments 1-3, and further specifies that the tapped coil is the only tapped coil, thereby conserving space in an implant.

Embodiment 5 includes the subject matter of any of Embodiments 1-4 and further specifies that the tapped coil is a single tapped coil and is operably coupled for wireless power transfer, data downlink, and data uplink.

Embodiment 6 includes the subject matter of any of Embodiments 1-5, and further specifies that the tapped coil antenna is operable to couple a downlink signal based on the RF signal from a remote transmitter received by the first section and the second section to the implant to provide electrical power and downlink data.

Embodiment 7 includes the subject matter of any of Embodiments 1-6, and further specifies that the second section of the tapped coil antenna is situated between and partially on top of first and second portions of the first section.

Embodiment 8 includes the subject matter of any of Embodiments 1-7, and further specifies that the second section of the tapped coil antenna is sandwiched between first and second portions of the first section.

Embodiment 9 includes the subject matter of any of Embodiments 1-8, and further includes a demodulator operable to produce downlink data based on a modulation of the RF signal.

Embodiment 10 includes the subject matter of any of Embodiments 1-9, and further includes a demodulator operable to produce downlink data based on an amplitude modulation of the RF signal.

Embodiment 11 includes the subject matter of any of Embodiments 1-10, and further specifies that the switch is operable to establish a charging state associated with an oscillating current in the second section of the tapped coil antenna and an emitting state associated with interrupting the established current at a timepoint when the oscillating current is proximate a maximum amplitude.

Embodiment 12 is a method, including receiving an RF signal with a tapped coil antenna having a first section and a second section to produce a received electrical signal; processing the received electrical signal to produce electrical power for operating an implant; and selectively connecting and disconnecting the second section of the tapped coil antenna based on uplink data to produce a corresponding pulsed magnetic field.

Embodiment 13 includes the subject matter of Embodiment 12, where the pulsed magnetic field is produced by selectively connecting the second section of the tapped coil antenna.

Embodiment 14 includes the subject matter of any of Embodiments 12-13, and further includes establishing an electrical current in a sinusoidal waveform in at least the second section of the tapped coil antenna, wherein the pulsed magnetic field is based on a selective interruption of the established electrical current in the second section of the tapped coil antenna at a timepoint when the current is at, or close to, a peak value.

Embodiment 15 includes the subject matter of any of Embodiments 12-14, and further specifies that the selective connecting or disconnecting the second section of the tapped coil antenna is produced with a switch.

Embodiment 16 includes the subject matter of any of Embodiments 12-15, and further specifies that the switch is a conductor-based switch or a semiconductor switch.

Embodiment 17 includes the subject matter of any of Embodiments 12-16, and further specifies that the second section of the tapped coil antenna is sandwiched between portions of the first section of the tapped coil antenna.

Embodiment 18 includes the subject matter of any of Embodiments 12-17, and further specifies that the second section of the tapped coil antenna is symmetrically sandwiched between portions of the first section of the tapped coil antenna.

Embodiment 19 includes the subject matter of any of Embodiments 12-18, and further specifies that the pulsed magnetic field is oscillatory at a frequency associated with producing the electrical power.

Embodiment 20 includes the subject matter of any of Embodiments 12-19, and further specifies that the received electrical signal includes a component at the frequency associated with producing the electrical power.

Embodiment 21 is a communication and power transfer system for an implant, including an antenna comprising a first section and a second section coupled in series; a switch operable to establish a current in the second section and interrupt the established current to produce a pulsed magnetic field with the first section and the second section of the antenna; and a controller coupled to close and open the switch to produce the pulsed magnetic field.

Embodiment 22 includes the subject matter of Embodiment 21, and further specifies that the antenna is a tapped helical coil or a tapped planar coil.

Embodiment 23 includes the subject matter of any of Embodiments 21-22, and further includes a rectifier and a demodulator coupled to the antenna and operable to produce electrical power and a data signal based on an RF signal received by the antenna.

In view of the many possible embodiments to which the principles of the disclosed technology may be applied, it should be recognized that the illustrated embodiments are only preferred examples and should not be taken as limiting the scope of the disclosure.

We claim:

1. A wireless power transfer and communication system, comprising:

a tapped coil antenna comprising a first section and a second section situated about a common axis, wherein the tapped coil antenna is operable to couple a downlink signal based on an RF signal from a remote transmitter to an implant to provide electrical power and downlink data; and a switch coupled to the implant and to the tapped coil antenna, wherein the switch is operable to selectively connect the second section of the tapped coil antenna to generate a corresponding pulsed magnetic field to transmit an uplink data signal, wherein the switch is operable to establish a charging state associated with an oscillating current in the second section of the tapped coil antenna and an emitting state associated with interrupting the established current at a timepoint when the oscillating current is proximate a maximum amplitude.

2. The wireless power transfer and communication system of claim 1, further comprising a rectifier coupled to the tapped coil antenna and to provide electrical power to the implant based on the downlink signal.

3. The wireless power transfer and communication system of claim 1, wherein the switch is operable to selectively connect and disconnect the second section of the tapped coil antenna based on the uplink data signal.

4. The wireless power transfer and communication system of claim 1, wherein the tapped coil is the only tapped coil, thereby conserving space in an implant.

5. The wireless power transfer and communication system of claim 1, wherein the tapped coil is a single tapped coil and is operably coupled for wireless power transfer, data downlink, and data uplink.

6. The wireless power transfer and communication system of claim 1, wherein the tapped coil antenna is operable to couple a downlink signal based on the RF signal from a remote transmitter received by the first section and the second section to the implant to provide electrical power and downlink data.

7. The wireless power transfer and communication system of claim 1, wherein the second section of the tapped coil antenna is situated between and partially on top of first and second portions of the first section.

8. The wireless power transfer and communication system of claim 1, wherein the second section of the tapped coil antenna is sandwiched between first and second portions of the first section.

9. The wireless power transfer and communication system of claim 1, further comprising a demodulator operable to produce downlink data based on a modulation of the RF signal.

10. The wireless power transfer and communication system of claim 1, further comprising a demodulator operable to produce downlink data based on an amplitude modulation of the RF signal.

11. The wireless power transfer and communication system of claim 1, wherein the switch is operable so that the charging state is associated with charging a capacitor that is coupled to the second section of the tapped coil antenna and the emitting state is associated with interrupting a connection of the capacitor to the second section of the tapped coil.

12. A method, comprising:

receiving an RF signal with a tapped coil antenna having a first section and a second section to produce a received electrical signal;

processing the received electrical signal to produce electrical power for operating an implant; and selectively connecting and disconnecting the second section of the tapped coil antenna based on uplink data to establish an oscillating current in the second section and interrupt the established current at a timepoint when the oscillating current is proximate a maximum amplitude to produce a corresponding pulsed magnetic field.

13. The method of claim 12, where the pulsed magnetic field is produced by selectively connecting the second section of the tapped coil antenna.

14. The method of claim 12, wherein the established electrical current has a sinusoidal waveform in at least the second section of the tapped coil antenna, wherein the pulsed magnetic field is based on a selective interruption of the established electrical current in the second section of the tapped coil antenna at a timepoint when the current is at, or close to, a peak value.

15. The method of claim 12, wherein the selective connecting or disconnecting the second section of the tapped coil antenna is produced with a switch.

16. The method of claim 15, wherein the switch is a conductor-based switch or a semiconductor switch.

17. The method of claim 12, wherein the second section of the tapped coil antenna is sandwiched between portions of the first section of the tapped coil antenna.

18. The method of claim 12, wherein the second section of the tapped coil antenna is symmetrically sandwiched between portions of the first section of the tapped coil antenna.

19. The method of claim 12, wherein the pulsed magnetic field is oscillatory at a frequency associated with producing the electrical power.

20. The method of claim 19, wherein the received electrical signal includes a component at the frequency associated with producing the electrical power.

21. A communication and power transfer system for an implant, comprising:

an antenna comprising a first section and a second section coupled in series;

a switch coupled to a capacitor and operable to establish a current in the second section and interrupt the established current at a timepoint when an oscillating current is proximate a maximum amplitude to produce a pulsed magnetic field with the first section and the second section of the antenna; and a controller coupled to close and open the switch to couple and decouple a capacitor to produce the pulsed magnetic field.

22. The system of claim 21, wherein the antenna is a tapped helical coil or a tapped planar coil.

23. The system of claim 21, further comprising a rectifier and a demodulator coupled to the antenna and operable to produce electrical power and a data signal based on an RF signal received by the antenna.

* * * * *